(12) United States Patent
White et al.

(10) Patent No.: US 7,188,908 B2
(45) Date of Patent: Mar. 13, 2007

(54) FURNITURE FRAME ATTACHMENT SYSTEM

(75) Inventors: Nikki White, Pontotoc, MS (US); Mike Crum, Mantachie, MS (US)

(73) Assignee: L&P Property Management Company, South Gate, CA (US)

( * ) Notice: Subject to any disclaimer, the term of this patent is extended or adjusted under 35 U.S.C. 154(b) by 368 days.

(21) Appl. No.: 10/844,031

(22) Filed: May 12, 2004

(65) Prior Publication Data
US 2005/0138884 A1 Jun. 30, 2005

(51) Int. Cl.
*A47C 7/02* (2006.01)
*F16L 23/00* (2006.01)

(52) U.S. Cl. .......................... 297/440.14; 297/452.18; 403/340

(58) Field of Classification Search ............. 297/440.1, 297/440.14, 440.15, 440.16, 440.2, 440.21, 297/452.18; 403/340
See application file for complete search history.

(56) References Cited

U.S. PATENT DOCUMENTS

| | | | |
|---|---|---|---|
| 18,375 A | * | 10/1857 | Bailey ........................ 297/325 |
| 2,914,118 A | * | 11/1959 | Sawyers ................. 297/440.23 |
| 2,994,888 A | * | 8/1961 | Egidio ............................ 5/296 |
| 3,669,494 A | | 6/1972 | Lohmeyer |
| 3,989,298 A | | 11/1976 | Cycowicz et al. |
| 5,135,284 A | | 8/1992 | Crum |
| 5,224,760 A | | 7/1993 | Gibbs |
| 5,265,939 A | | 11/1993 | Self et al. |
| 5,727,849 A | | 3/1998 | Nelson |
| 5,860,759 A | * | 1/1999 | Leicht ......................... 403/334 |
| 6,241,317 B1 | * | 6/2001 | Wu ......................... 297/440.23 |
| 6,692,079 B2 | | 2/2004 | Guillot |
| 2004/0021359 A1 | | 2/2004 | Chang |

* cited by examiner

Primary Examiner—Peter M. Cuomo
Assistant Examiner—Joe Edell
(74) Attorney, Agent, or Firm—Shook, Hardy & Bacon LLP

(57) ABSTRACT

This invention is related to a knock down frame attachment system. The knock down frame attachment system includes a seating portion, a pair of side panels and a plurality of sets of mounting brackets. A set includes both a left and a right mounting bracket. A set of brackets are coupled to each side of the seating portion and to both side panels. Thus, two sets of brackets are required to attach a side panel to the seating portion.

24 Claims, 3 Drawing Sheets

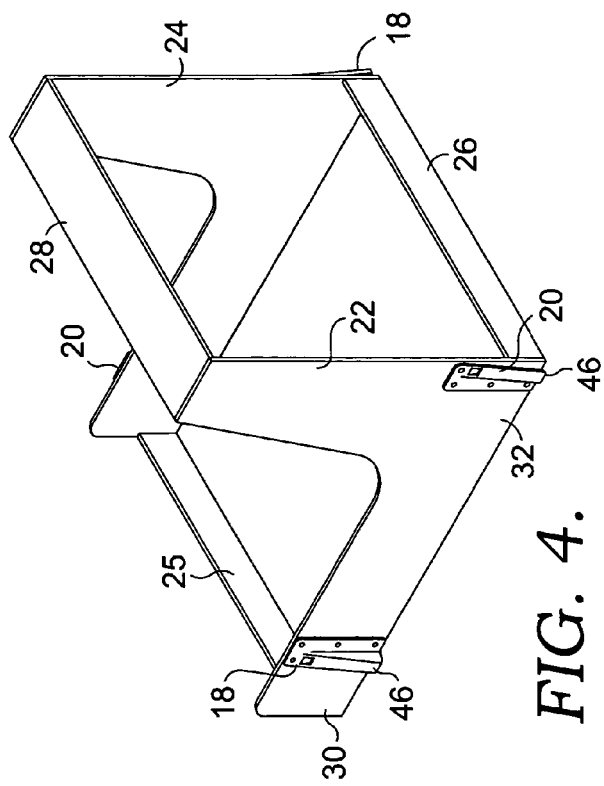
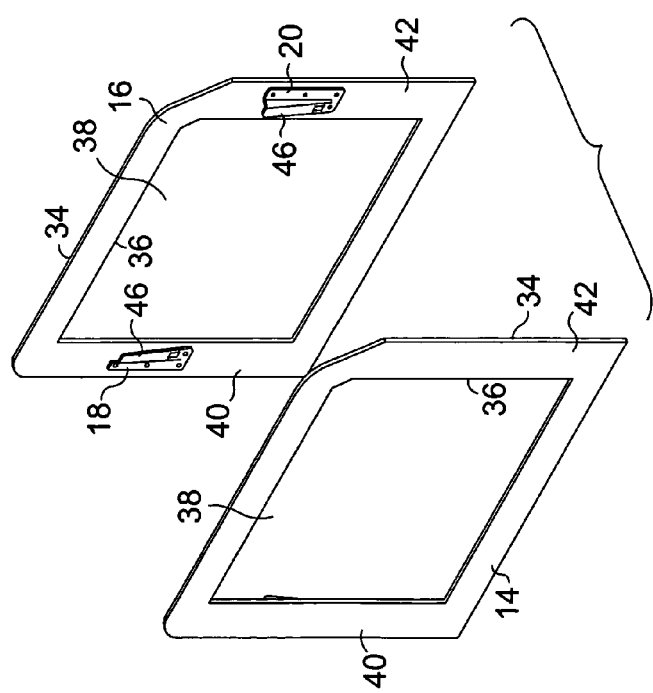
FIG. 4.
FIG. 3.

FURNITURE FRAME ATTACHMENT SYSTEM

CROSS-REFERENCE TO RELATED APPLICATIONS

This application claims the benefit of U.S. Ser. No. 10/748.048, filed Dec. 30, 2003, entitled "Furniture Frame Attachment System".

STATEMENT REGARDING FEDERALLY SPONSORED RESEARCH OR DEVELOPMENT

Not applicable

BACKGROUND OF THE INVENTION

This invention relates to a furniture frame attachment system for furniture, and more particularly to a knock down frame attachment system that allows a furniture frame to be easily disassembled for transportation.

Typical furniture in the industry generally is provided to the consumer in two forms, assembled and disassembled. Fully assembled furniture has become increasingly expensive to produce due to the trend of companies manufacturing the furniture overseas and shipping to other destinations for sale. While rigid attachment and full assembly are necessary for stability during use, they greatly affect the size and the shape of the furniture items during shipment. Disassembled furniture is also available and has a number of advantages including a decreased number of furniture components and decreased shipping costs, as disassembled furniture may be packed more densely as compared with assembled furniture. However, disassembled furniture comes with the drawback that an unsophisticated consumer may have difficulty with the assembly. Additionally, knock down furniture frames may be manufactured overseas. These frames may then be shipped to an assembler or finisher, who assembles the frames and performs any needed finish work on the furniture. Again, the knock down frame provides lower shipping costs. However, any provided knock down frames must supply the necessary support and rigidity to the final furniture piece.

Another drawback of the present systems is once assembled, the brackets may become wedged together such that a simple and easy disassembly may not be possible.

Thus, there remains a need for a system that allows for quick and easy assembly and disassembly of furniture items. More specifically, there is a need in the furniture industry for a system that allows furniture items to be easily disassembled for shipment to decrease the shipping destination costs.

BRIEF SUMMARY OF THE INVENTION

Accordingly, it is the object of the present invention to provide a furniture frame attachment system that allows for quick and easy assembly and disassembly of a furniture item.

It is a further object of the present invention to provide a knock down frame attachment system that allows for quick and easy assembly and disassembly of furniture items for ease of packing to reduce shipping destination charges.

Accordingly, the present invention provides a knock down frame attachment system that allows for quick and easy assembly and disassembly of furniture items. The knock down frame attachment system includes a first panel that is to be attached to a second panel and at least two sets of mounting brackets. A set includes both a left and a right mounting bracket. A set of brackets is coupled to each of the first and second panels. Thus, two sets of brackets are required to attach the first and second panels.

In use, the assembly and disassembly of the frame using the attachment system is performed with relative ease. To assemble the frame, the user simply places the first and second panels in an orientation that aligns the respective mounting brackets and slides the two panels towards each other. The brackets on the panels engage each other in an interlocking fashion so that the two panels are secured together. To disassemble the system, the user simply separates the two panels with a pulling force that disengages the brackets.

Additional advantages, and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views:

FIG. 3 is a perspective view of a pair of side panels;

FIG. 4 is a perspective view of the seating portion of an illustrative frame;

DETAILED DESCRIPTION OF THE INVENTION

Figure 1:
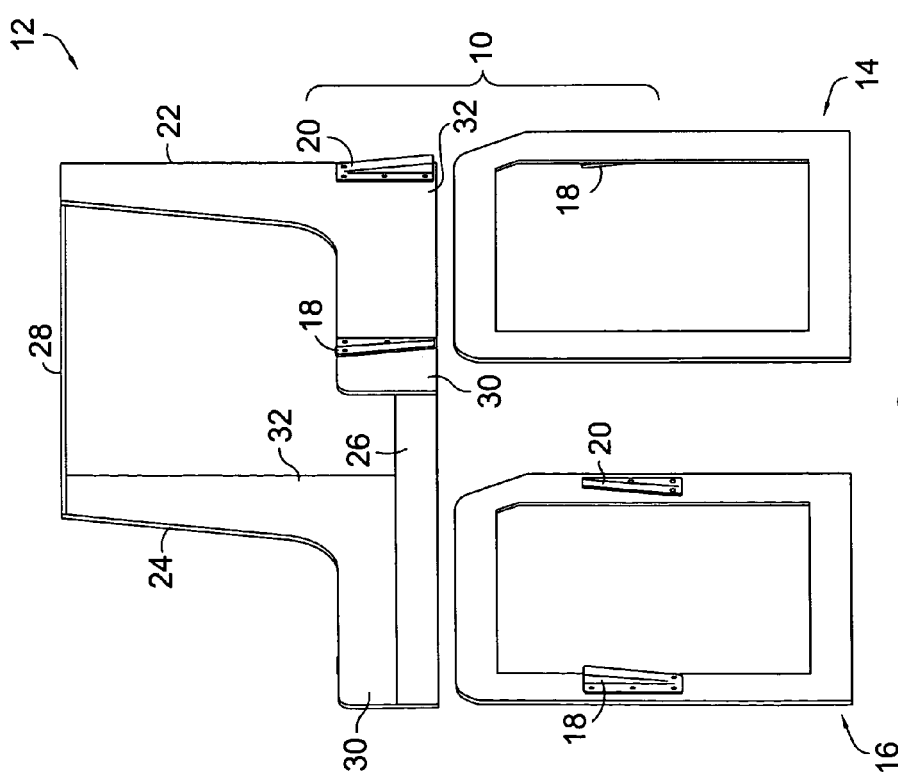
FIG. 1 is a perspective view of a knock down frame attachment system in the disassembled configuration.

Referring to the drawings in greater detail and initially to FIG. 1, a frame for a chair is shown and designated generally by the numeral 10. Chair frame 10 includes a seating portion 12, a pair of side panels 14, 16 and left and right mounting brackets 18, 20. As can be seen, the seating portion 12 serves both as a support for a seat cushion and a backrest. Seating portion 12 and side panels 14, 16 are well known in the art. The invention is shown and discussed with respect to chair frame 10. It should be understood, however, that the invention is applicable to attach any two vertically oriented frame members of a piece of furniture.

As further illustrated in FIG. 1, seating portion 12 broadly includes a pair of L-shaped members 22, 24 and cross-support members 26, 28. L-shaped members 22, 24 further include a forward portion 30 and an aft portion 32. Cross-support members 26, 28 are fixably coupled between L-shaped members 22. Any suitable attachment mechanism could be used for coupling cross-support members 26, 28 to L-shaped members 22, 24, such as screws, bolts, pins or the like.

As illustrated in FIGS. 1 and 3, side panels 14, 16 are generally rectangular in nature with an outer edge 34 and an inner edge 36. The inner edge 36 is also generally rectangular in nature and defines a void 38. Side panels 14, 16 further include a forward section 40 and an aft section 42.

Figure 6:
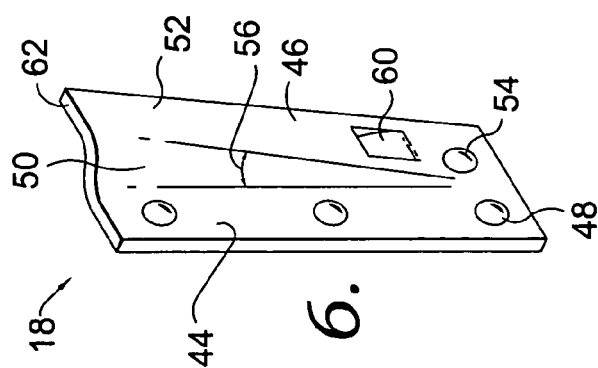
FIG. 6 is a perspective view of the left mounting bracket.

As best illustrated in FIG. 1, left and right mounting brackets 18, 20 are coupled to both the seating portion 12 and the side panels 14, 16, as will be described in more detail below. As shown in FIGS. 3 and 4, it will be appreciated that left and right mounting brackets 18, 20 are mirror images of one another. As shown in FIG. 6, left mounting bracket 18 broadly includes a mounting flange 44 and a tapered section 46. Mounting flange 44 abuts an end of tapered section 46. Mounting flange 44 and tapered section 46 may be integral or formed from two pieces and attached by welding or any other suitable method. Left and right mounting brackets 18, 20 may be formed from cast, bent or stamped steel, aluminum or any other suitable material having similar characteristics.

Figure 2:
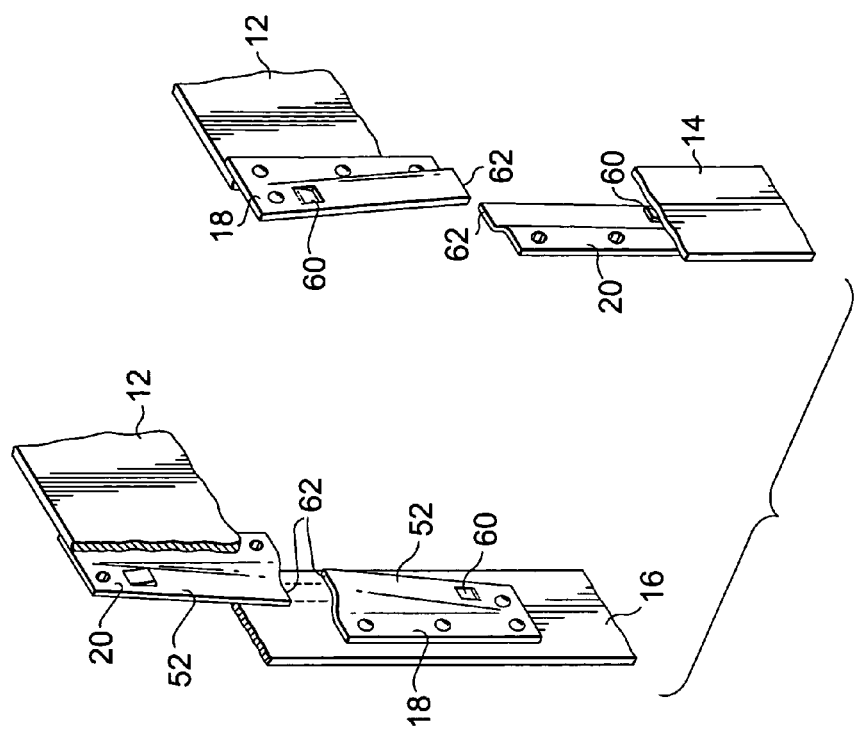
FIG. 2 is an enlarged, perspective view of left and right mounting brackets with parts being broken away to show particular details of construction.
Figure 7:
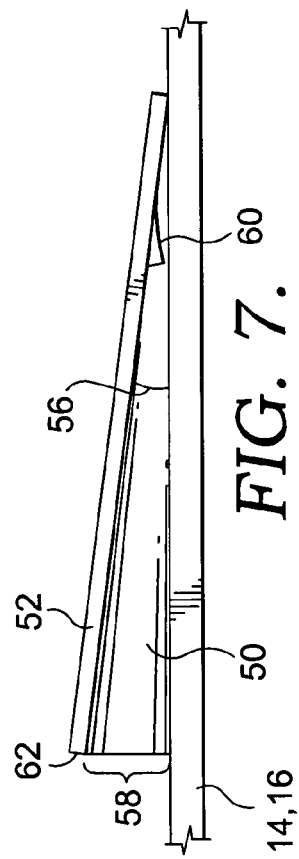
FIG. 7 is a side elevation view of the right mounting bracket.

With continuing reference to FIG. 6, mounting flange 44 is generally rectangular in nature with a plurality of apertures 48 defined therein to facilitate attachment to the seating member 12 and side panels 14, 16. As seen in FIGS. 6 and 7, tapered section 46 includes a raised portion 50 and a mating surface 52. As stated above, mounting flange 44 abuts an end of raised portion 50. Raised portion 50 is tapered along its length and defines an angle of inclination 56 of the mating surface 52. It will be appreciated that the angle of inclination 56 of both the left and right mounting brackets 18, 20 are the same. Mating surface 52 abuts the other end of raised portion 50. Mating surface 52 preferably contains an aperture 54 at one end for attachment to the seating member 12 and side panels 14, 16. As best seen in FIGS. 6 and 7, mating surface 52 further contains a stop 60 and an end portion 62. Stop 60 is generally square-shaped and is formed by cutting three sides and bending the resulting tab inwardly. Referring now to FIG. 2, stop 60 projects inwardly toward the seating member 12 and side panels 14, 16. Raised portion 50 and mating surface 52 may be integrally formed. Alternatively, raised portion 50 may be rigidly coupled to mating surface 52 along the length of raised portion 50, but is preferably formed from one piece of material.

As further shown in FIGS. 1 and 3, left and right mounting brackets 18, 20 are coupled to side panels 14, 16. Any suitable attachment mechanism could be used for coupling left and right mounting brackets 18, 20 to side panels 14, 16, such as screws, bolts, pins or the like. Specifically, left mounting bracket 18 is coupled to aft section 42 of side panel 14 and forward section 40 of side panel 16. Further, right mounting bracket 20 is coupled to forward section 40 of side panel 14 and aft section 42 of side panel 16. As shown in FIG. 3, left and right mounting brackets 18, 20 are oriented so that tapered section 46 is facing inwardly and is tapered from top to bottom, the importance of which will be described further below. More specifically, as shown in FIGS. 3 and 7, raised portion 50 defines an opening 58 between tapered section 46 and side panels 16, 18. The mounting brackets are oriented on the side panels so that opening 58 is at the top.

Also illustrated in FIGS. 1 and 4, left and right mounting brackets 18, 20 are coupled to L-shaped members 22, 24 of seating portion 12. Any suitable attachment mechanism could be used for coupling left and right mounting brackets 18, 20 to L-shaped members 22, 24, such as screws, bolts, pins or the like. Specifically, brackets 18, 20 are coupled to the lower portion of L-shaped members 22, 24. More specifically, left mounting bracket 18 is coupled to the forward portion 30 of L-shaped member 22 and the aft portion 32 of L-shaped member 24. As shown in FIG. 4, right mounting bracket 20 is coupled to the forward portion 30 of L-shaped member 24 and the aft portion 32 of L-shaped member 22. Left and right mounting brackets 18, 20 are oriented so that tapered section 46 is facing outwardly and is tapered from bottom to top, the importance of which will be described further below. More specifically, the brackets are oriented with the opening 58 at the bottom.

Figure 5:
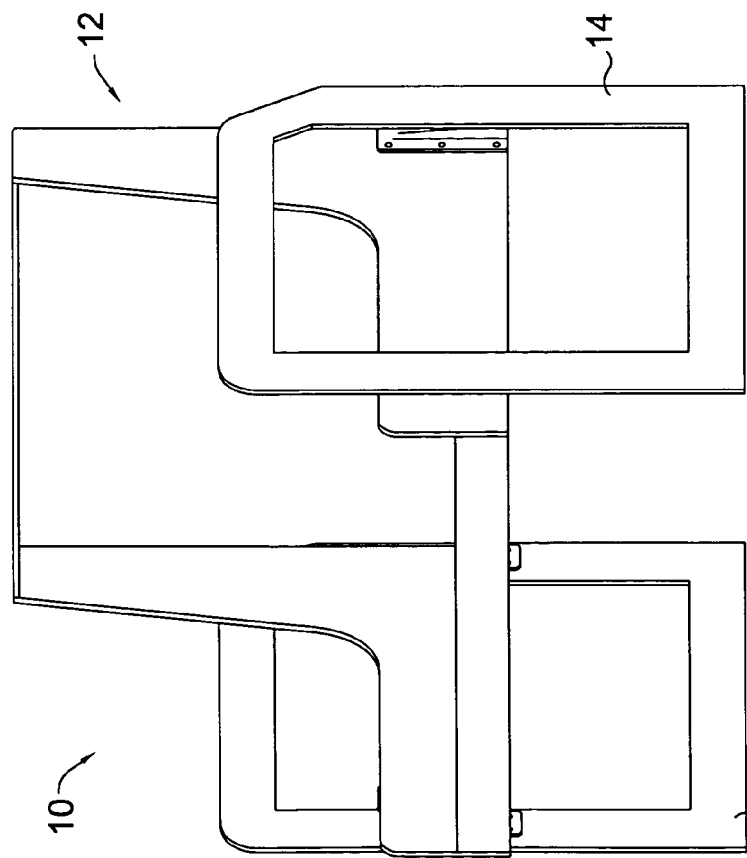
FIG. 5 is a perspective view of the knock down frame attachment system of FIG. 1 in the assembled configuration.

The assembly of the knock down frame attachment system is described with reference to FIGS. 1 and 5. FIG. 1 represents the knock down frame attachment system in the disassembled configuration while FIG. 5 represents the knock down frame attachment system in the assembled configuration. As shown in FIGS. 1 and 2, left and right mounting brackets 18, 20 on L-shaped member 22 are aligned with corresponding right and left mounting brackets 20, 18 on side panel 14. Similarly, right and left mounting brackets 20, 18 on L-shaped bracket 24 are aligned with corresponding left and right mounting brackets 18, 20 on side panel 16.

To engage the mounting brackets coupled to the seating portion 12 and side panels 14, 16, a user lowers seating portion 12 onto side panels 14, 16 whereupon the mounting brackets 18, 20 on seating portion 12 are slidably engaged with mounting brackets 18, 20 on side panels 14, 16.

As best illustrated in FIG. 2, the mating surfaces 52 are substantially parallel when the corresponding left and right mounting brackets 18, 20 are engaged. Once engaged the weight of the user creates an interlocking fit between mounting brackets 18, 20. However, the mating surfaces 52 may only engage until the end portions 62 contact the stops 60 on each respective mounting bracket 18, 20. Further, the surfaces of seating portion 12 and side panels 14, 16 are substantially parallel when the knock down frame attachment system is assembled.

Also illustrated in FIGS. 1 and 3, mating surfaces 52 of left and right mounting brackets 18, 20 on side panels 14, 16 project inwardly. Additionally, as shown in FIGS. 1 and 4, mating surfaces 52 of left and right mounting brackets 18, 20 on seating portion 12 project outwardly. It will be appreciated that the opposed orientation of the mating surfaces 52 on the left and right mounting brackets 18, 20 prevent fore to aft movement of the seating portion 12 with respect to the side panels 14, 16. It will also be appreciated that an opposite orientation of the mating surfaces 52 of the left and right mounting brackets 18, 20 with respect to the seating portion 12 and the side panels 14, 16 will accomplish the same purpose.

The frame attachment system allows the frame to be shipped in an unassembled form, which reduces the overall costs of shipping. Additionally, the system is easy and intuitive to use.

The present invention has been described in relation to particular embodiments, which are intended in all respects to be illustrative rather than restrictive. Alternative embodiments will become apparent to those skilled in the art to which the present invention pertains without departing from its scope. The invention is described above in relation to a chair in which two side panels are attached to a central seating frame. It should be understood from the above description that the brackets described can be used to quickly couple two panels of any furniture frame together.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. An attachment system for assembling a frame comprising:
    a first frame member;
    a first set of mounting brackets coupled to the first frame member, the mounting brackets including a mounting flange and a tapered section, the tapered section having a raised portion and a mating surface with a stop and an end portion, the mating surface having a top and a bottom, the stop being located at a position intermediate the top and the bottom;
    a second frame member; and
    a second set of mounting brackets coupled to the second frame member, the mounting brackets including a mounting flange and a tapered section, the tapered section having a raised portion and a mating surface with a stop and an end portion, the mating surface having a top and a bottom, the stop being located at a position intermediate the top and the bottom;
    wherein the first and second sets of mounting brackets are positioned on their respective frame members so that the raised portions and the mating surfaces of the first set of mounting brackets is aligned with the raised portions and the mating surfaces of the second set of mounting brackets so that the brackets are slidably engagable to provide an interlocking fit and wherein mating surfaces of first and second sets of mounting brackets may only engage until each end portion contacts stops.

2. The attachment system of claim 1, wherein the first and second sets of mounting brackets include a left and a right mounting bracket.

3. The attachment system of claim 2, wherein the left and right mounting brackets are mirror images of one another.

4. The attachment system of claim 3, wherein the mating surfaces on the first set of mounting brackets project outwardly.

5. The attachment system of claim 4, wherein the mating surfaces on the first set of mounting brackets taper from top to bottom.

6. The attachment system of claim 5, wherein the mating surfaces on the second set of mounting brackets project inwardly.

7. The attachment system of claim 6, wherein the mating surfaces on the second set of brackets taper from bottom to top.

8. The attachment system of claim 1, wherein the stop projects inwardly.

9. A frame attachment system for assembling furniture, comprising:
    a pair of side panels;
    a first set of mounting brackets coupled to each of said side panels; the mounting brackets including a mounting flange and a tapered section, the tapered section having a raised portion and a mating surface with a stop and an end portion, the mating surface having a top and a bottom, the stop being located at a position intermediate the top and the bottom;
    a seat portion having first and second sides; and
    a second set of mounting brackets coupled to each of the first and second sides of the seat portion; the mounting brackets including a mounting flange and a tapered section, the tapered section having a raised portion and a mating surface with a stop and an end portion, the mating surface having a top and a bottom, the stop being located at a position intermediate the top and the bottom;
    wherein the first set of mounting brackets and the second set of mounting brackets are positioned with respect to each other so that the raised portions and the mating surfaces of the first set of mounting brackets is aligned with the raised portions and the mating surfaces of the second set of mounting brackets so that the brackets are slidably engagable to provide an interlocking fit and wherein mating surfaces of first and second sets of mounting brackets may only engage until each end portion contacts stops.

10. The frame attachment system of claim 9, wherein the set of mounting brackets include a left and a right mounting bracket.

11. The frame attachment system of claim 10, wherein the left and right mounting brackets are mirror images of one another.

12. The frame attachment system of claim 11, wherein the mating surfaces on the first set of mounting brackets project inwardly.

13. The frame attachment system of claim 12, wherein the mating surfaces on the first set of mounting brackets taper from bottom to top.

14. The frame attachment system of claim 13, wherein the mating surfaces on the second set of mounting brackets project outwardly.

15. The frame attachment system of claim 14, wherein the mating surfaces on the second set of mounting brackets taper from to bottom.

16. The attachment system of claim 1, wherein the stop projects inwardly.

17. A frame attachment system for assembling furniture, comprising:
    a pair of side panels;
    a first means for attaching said side panels coupled to each of said side panels; the first means for attaching including a mounting flange and a tapered section, the tapered section having a raised portion and a mating surface with a stop and an end portion, the mating surface having a top and a bottom, the stop being located at a position intermediate the top and the bottom;
    a seat portion having first and second sides and a second means for attaching each of the first and second sides of the seat portion; the second means for attaching including a mounting flange and a tapered section, the tapered section having a raised portion and a mating surface with a stop and an end portion, the mating surface having a top and a bottom, the stop being located at a position intermediate the top and the bottom;
    wherein the first means for attaching and the second means for attaching are positioned where the mating surfaces are slidably engaged and wherein the engage ment of the first and second means for attaching provide an interlocking fit and wherein the first attachment means and the second attachment means may only engage until each end portion contacts stops.

18. The frame attachment system of claim 17, wherein each of the first and second means for attaching include a left and a right mounting bracket.

19. The frame attachment system of claim 18, wherein the left and right mounting brackets are mirror images of one another.

20. The frame attachment system of claim 19, wherein the mating surfaces on first means for attaching project inwardly.

21. The frame attachment system of claim 20, wherein the mating surfaces on first means for attaching taper from bottom to top.

22. The frame attachment system of claim 21, wherein the mating surfaces on second means for attaching project outwardly.

23. The frame attachment system of claim 22, wherein the mating surfaces on second means for attaching taper from top to bottom.

24. The frame attachment system of claim 17, wherein the stop projects inwardly.

* * * * *